US012679965B2

(12) United States Patent
Fujii et al.

(10) Patent No.: US 12,679,965 B2
(45) Date of Patent: *Jul. 14, 2026

(54) COMPOSITION, COATING, FILM, AND BASE MATERIAL

(71) Applicant: KURARAY CO., LTD., Kurashiki (JP)

(72) Inventors: Yuki Fujii, Kurashiki (JP); Kenta Toshinari, Tsukuba (JP); Yasunari Umeda, Tsukuba (JP); Atsushi Inatomi, Tsukuba (JP); Akio Fujita, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 659 days.

This patent is subject to a terminal disclaimer.

(21) Appl. No.: 17/414,138

(22) PCT Filed: Dec. 20, 2019

(86) PCT No.: PCT/JP2019/050072
§ 371 (c)(1),
(2) Date: Jun. 15, 2021

(87) PCT Pub. No.: WO2020/130132
PCT Pub. Date: Jun. 25, 2020

(65) Prior Publication Data
US 2022/0081546 A1 Mar. 17, 2022

(30) Foreign Application Priority Data

Dec. 21, 2018 (JP) ................................. 2018-240327

(51) Int. Cl.
C08L 29/04 (2006.01)
C08F 2/26 (2006.01)
(Continued)

(52) U.S. Cl.
CPC ................ C08L 29/04 (2013.01); C08F 2/26 (2013.01); C08F 2/38 (2013.01); C08F 216/06 (2013.01);
(Continued)

(58) Field of Classification Search
CPC .................. C08F 218/08; C08F 210/02; C08F 220/1804; C08F 220/1803; C08F 222/103;
(Continued)

(56) References Cited

U.S. PATENT DOCUMENTS 5,792,809 A 8/1998 Nagao et al.
5,895,797 A 4/1999 Hayashihara et al.
(Continued)

FOREIGN PATENT DOCUMENTS

EP 1 146 273 A1 10/2001
EP 2 263 869 A1 12/2010
(Continued)

OTHER PUBLICATIONS

International Search Report mailed on Mar. 3, 2020 in PCT/JP2019/050072 filed on Dec. 20, 2019 (3 pages).
(Continued)

*Primary Examiner* — Eli D. Strah
(74) *Attorney, Agent, or Firm* — Oblon, McClelland, Maier & Neustadt, L.L.P.

(57) ABSTRACT

A composition may contain a wide variety of particles with good dispersibility, the composition being able to make both rigidity and elongation at sufficient levels compatible with each other even under a low humidity. A coating and a film may each be formed of such a composition, and a base material having the foregoing coating or film. Specifically, the composition may contain an ethylene-vinyl alcohol copolymer (A) having the content of an ethylene unit of 0.5 to 19 mol % relative to all structural units and a particle (B), (Continued)

1000 nm wherein the content of the particle (B) is 1 part by mass or more and less than 100 parts by mass based on 100 parts by mass of the ethylene-vinyl alcohol copolymer (A).

20 Claims, 1 Drawing Sheet

(51) Int. Cl.

| | |
|---|---|
| *C08F 2/38* | (2006.01) |
| *C08F 216/06* | (2006.01) |
| *C08F 220/18* | (2006.01) |
| *C08F 220/40* | (2006.01) |
| *C08F 222/10* | (2006.01) |
| *C08J 5/18* | (2006.01) |
| *C08L 23/08* | (2025.01) |
| *C08L 51/00* | (2006.01) |
| *C09D 7/65* | (2018.01) |
| *C09D 129/04* | (2006.01) |
| *C09J 129/04* | (2006.01) |
| *C08F 120/12* | (2006.01) |
| *C08F 218/08* | (2006.01) |

(52) U.S. Cl.
  CPC ...... *C08F 220/1804* (2020.02); *C08F 220/40* (2013.01); *C08F 222/103* (2020.02); *C08J 5/18* (2013.01); *C08L 23/08* (2013.01); *C08L 51/003* (2013.01); *C09D 7/65* (2018.01); *C09D 129/04* (2013.01); *C09J 129/04* (2013.01); *C08F 120/12* (2013.01); *C08F 218/08* (2013.01); *C08F 220/1811* (2020.02); *C08F 220/1812* (2020.02); *C08J 2329/04* (2013.01); *C08J 2433/08* (2013.01); *C08J 2451/00* (2013.01); *C08L 2203/16* (2013.01); *C08L 2205/22* (2013.01); *C08L 2207/53* (2013.01)

(58) Field of Classification Search
  CPC .............. C08F 220/1811; C08F 220/40; C08F 216/06; C08L 29/04; C08L 33/08; C08L 51/003; C08L 33/10; C09D 129/04; C09J 129/04
  See application file for complete search history.

(56) References Cited

U.S. PATENT DOCUMENTS

| | | | |
|---|---|---|---|
| 6,447,858 B1 | 9/2002 | Shimo et al. | |
| 6,759,107 B1 | 7/2004 | Tai et al. | |
| 2002/0143098 A1* | 10/2002 | Kawai | C08J 3/005 |
| | | | 264/177.1 |
| 2009/0012236 A1 | 1/2009 | Isoyama et al. | |
| 2009/0118416 A1* | 5/2009 | Nakamae | C09D 7/65 |
| | | | 524/503 |
| 2011/0045251 A1 | 2/2011 | Kazeto et al. | |
| 2014/0255629 A1* | 9/2014 | Misiak | D21H 21/16 |
| | | | 524/45 |
| 2019/0345309 A1 | 11/2019 | Okamoto et al. | |

FOREIGN PATENT DOCUMENTS

| | | | | | |
|---|---|---|---|---|---|
| JP | 8-283682 | A | | 10/1996 | |
| JP | 9-328581 | A | | 12/1997 | |
| JP | H-09328581 | A | * | 12/1997 | ............. C08L 29/04 |
| JP | 10-001579 | A | | 1/1998 | |
| JP | 2000-169650 | A | | 6/2000 | |
| JP | 2001-072873 | A | | 3/2001 | |
| JP | 2001-172593 | A | | 6/2001 | |
| JP | 2002052659 | A | * | 2/2002 | |
| JP | 2002-285070 | A | | 10/2002 | |
| JP | 2017-117789 | A | | 6/2017 | |
| WO | WO 2006/075591 | A1 | | 7/2006 | |
| WO | WO 2018/124295 | A1 | | 7/2018 | |

OTHER PUBLICATIONS

Japanese Office Action issued Feb. 21, 2023 in Japanese Patent Application No. 2020-561542 (with English machine translation), 7 pages.
Extended European Search Report issued Aug. 26, 2022 in European Patent Application No. 19901082.8. 7 pages.

\* cited by examiner

COMPOSITION, COATING, FILM, AND BASE MATERIAL

CROSS-REFERENCE TO RELATED APPLICATIONS

The present application is the national stage of international application PCT/JP2019/050072, filed on Dec. 20, 2019, and claims the benefit of the filing date of Japanese Appl. No. 2018-240327, filed on Dec. 21, 2018.

TECHNICAL FIELD

The present invention relates to a composition, a coating, a film, and a base material.

BACKGROUND ART

Polyvinyl alcohol-based resins include, in addition to a homopolymer composed of a structural unit derived from vinyl alcohol, a copolymer resin having a structural unit derived from vinyl alcohol and a structural unit derived from ethylene, and so on. These are utilized for extensive applications, such as a fiber processing agent, a coating, a wrapping film, an oxygen barrier film, a binder, and a paint. In particular, in an application for fiber processing agent, an application for coating, an application for film, and an application for binder, a requirement for making both toughness, especially rigidity at the time of stretching (yield stress or resilience and elastic modulus), and elongation compatible with each other is strong. As one of improvement methods of physical properties, addition of polymer particles is exemplified. But, in the case of adding polymer particles to an aqueous solution of a polyvinyl alcohol-based resin, aggregation of the polymer particles occurs depending upon the condition, thereby lowering a performance of the polyvinyl alcohol-based resin. Accordingly, in order to improve the performance of the polyvinyl alcohol-based resin, it is necessary to combine polymer particles having good dispersibility, and therefore, the composition of the polymer particles was frequently restricted.

Under such a circumstance, as polymer particles having good dispersibility relative to the polyvinyl alcohol-based resin, there are proposed emulsions in which polymer particles produced using a modified polyvinyl alcohol as a dispersion stabilizer are formed, and the thus-obtained polymer particles are added to a polyvinyl alcohol-based resin (see PTLs 1 and 2).

PTL 1 describes that when an aqueous emulsion containing polymer particles having a modified polyvinyl alcohol as a dispersion stabilizer in a particle outermost layer is added to polyvinyl alcohol, and subsequently, a film is formed, aggregation of the polymer particles hardly occurs as compared with the case of using polymer particles using a dispersion stabilizer of another kind and the case of using polymer particles formed without using a dispersion stabilizer, the impact resistance under a low-temperature and low-humidity condition is improved, and the formed film has tensile strength and elastic modulus even under a high humidity. PTL 2 describes that a binder composition for secondary battery negative electrode, which is obtained by adding polymer particles formed using a modified polyvinyl alcohol having a 1,2-diol structure in the side chain as a dispersion stabilizer in a predetermined ratio in a polyvinyl alcohol-based resin aqueous solution is excellent in a balance between elastic modulus and flexibility.

CITATION LIST

Patent Literature

PTL 1: JP 09-328581 A
PTL 2: JP 2017-117789 A

SUMMARY OF INVENTION

Technical Problem

However, according to the methods disclosed in PTLs 1 and 2, on the occasion of forming the polymer particles, it is indispensable to use the relatively expensive modified polyvinyl alcohol, and development of a technique free from such a restriction is demanded.

In addition, according to the investigations made by the present inventors, it has become clear that in PTLs 1 and 2, though the dispersibility of the polymer particles could be improved, it is not always able to make both rigidity at a high level and elongation compatible with each other. Here, in this specification, the wording "rigidity at a high level" means a high yield stress or high resilience and high elastic modulus.

Then, an object of the present invention is to provide a composition containing a wide variety of particles with good dispersibility, the composition being able to make both rigidity and elongation at sufficient levels compatible with each other even under a low humidity, etc., a coating and a film each formed of the foregoing composition, and a base material having the foregoing coating or film.

Solution to Problem

The present inventors made extensive and intensive investigations. As a result, they have found that the aforementioned problem can be solved by using, as a polyvinyl alcohol-based resin, an ethylene-vinyl alcohol copolymer (A) in which the content of an ethylene unit is a predetermined amount and containing a predetermined amount of a particle (B) and further made investigations on the basis of the foregoing finding, thereby leading to accomplishment of the present invention.

Specifically, the present invention is as follows.

[1] A composition containing an ethylene-vinyl alcohol copolymer (A) having the content of an ethylene unit of 0.5 to 19 mol % relative to all structural units and a particle (B), wherein the content of the particle (B) is 1 part by mass or more and less than 100 parts by mass based on 100 parts by mass of the ethylene-vinyl alcohol copolymer (A).

[2] The composition as set forth above in [1], wherein the particle (B) is at least one selected from the group consisting of a polymer particle $(B^X)$ and an inorganic particle $(B^Y)$.

[3] The composition as set forth above in [2], wherein the polymer particle $(B^X)$ is at least one selected from the group consisting of a (meth)acrylic acid ester-based polymer particle, a conjugated diene-based polymer particle, a styrene-based polymer particle, a styrene/conjugated diene-based copolymer particle, a urethane-based polymer particle, a vinyl acetate-based polymer particle, an ester-based polymer particle, an amide-based polymer particle, an imide-based polymer particle, a carbonate-based polymer particle, an allylate-based polymer particle, a sulfone-based polymer particle, and a phenoxy-based polymer particle.

[4] The composition as set forth above in [2] or [3], wherein the polymer particle (B$^X$) is at least one selected from the group consisting of a (meth)acrylic acid ester-based single-layer type polymer particle and a (meth)acrylic acid ester-based core-shell type polymer particle.

[5] The composition as set forth above in any of [2] to [4], wherein the polymer particle (B$^X$) contains a dispersant containing an ionic group.

[6] The composition as set forth above in [5], wherein the ionic group is at least one selected from the group consisting of an anionic group and a group composed of a salt of an anionic group.

[7] A coating formed of the composition as set forth above in any of [1] to [6].

[8] A film formed of the composition as set forth above in any of [1] to [6].

[9] A base material having the coating as set forth above in [7] or the film as set forth above in [8].

[10] The composition as set forth above in any of [1] to [6], which is an application for adhesive, an application for fiber processing agent, an application for binder, an application for coating agent, an application for ink, or an application for paint.

Advantageous Effects of Invention

In accordance with the present invention, it is possible to provide a composition containing a wide variety of particles with good dispersibility, the composition being able to make both rigidity and elongation at sufficient levels compatible with each other even under a low humidity, etc., a coating and a film each formed of the foregoing composition, and a base material having the foregoing coating or film.

DESCRIPTION OF EMBODIMENTS

[Composition]

Figure 1:
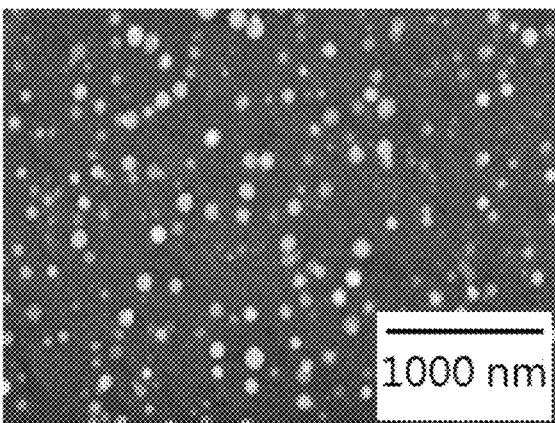
FIG. 1 is a photograph by a transmission electron microscope (TEM) (direct magnification: 10,000 times) of a cast film prepared in Example 2.

The composition of the present invention is a composition containing an ethylene-vinyl alcohol copolymer (A) having the content of an ethylene unit of 0.5 to 19 mol % relative to all structural units [hereinafter occasionally referred to simply as "ethylene-vinyl alcohol copolymer (A)" or "ethylene-modified PVA (A)"] and a particle (B), wherein the content of the particle (B) is 1 part by mass or more and less than 100 parts by mass based on 100 parts by mass of the ethylene-vinyl alcohol copolymer (A).

When the content of the particle (B) is less than 1 part by mass, on the occasion of forming the composition into a film and using it, it is difficult to make both rigidity and elongation at sufficient levels compatible with each. In addition, when the content of the particle (B) is 100 parts by mass or more, the dispersibility of the particle (B) and the rigidity or elongation are lowered.

From the same viewpoint, the content of the particle (B) is preferably 1 to 70 parts by mass, more preferably 3 to 50 parts by mass, still more preferably 3 to 40 parts by mass, and especially preferably 5 to 30 parts by mass based on 100 parts by mass of the ethylene-modified PVA (A).

From the viewpoint of making both rigidity and elongation at sufficient levels compatible with each other under a low humidity, etc., the total content of the ethylene-modified PVA (A) and the particle (B) in the composition of the present invention is preferably 50% by mass or more, more preferably 70% by mass or more, and still more preferably 90% by mass or more, and it may be substantially 100% by mass.

In this specification, the "room temperature" indicates 25° C.

The respective components which the composition of the present invention contains are hereunder described in detail in order.

<Ethylene-Vinyl Alcohol Copolymer (A)>

The ethylene-vinyl alcohol copolymer (A) [ethylene-modified PVA (A)] which is used in the present invention is an ethylene-modified body of a polymer having a vinyl alcohol unit (as the case may be, a polymer having a vinyl alcohol unit and a vinyl alcohol derivative unit) [hereinafter referred to as "PVA-based polymer"]. The content of the ethylene unit in the ethylene-modified PVA (A) is 0.5 to 19 mol % relative to all structural units.

In this specification, the wording "having ×× unit" means "having a structural unit derived from ××". The polyvinyl alcohol unit is a structural unit connected at a vinyl group site and having a hydroxy group as a side chain thereof. Although the vinyl alcohol derivative unit is not particularly restricted, examples thereof include (1) a structural unit in which the hydroxy group which the vinyl alcohol unit has is converted into an acetoxy group; and (2) a structural unit in which two of the vinyl alcohol units are acetalized. The vinyl alcohol derivative unit may be one in which its structural unit may be derived from the vinyl alcohol unit, or one capable of being converted into vinyl alcohol from the derivative unit, and it is not always meant that the vinyl alcohol derivative unit should be one derived from vinyl alcohol.

Although there is no particular restriction, the ethylene-modified PVA (A) may also be an ionomer. The ionomer is defined in the same manner as in a general definition, and namely, it means a polymer having an intermolecular cross-linked structure owing to ions or an aggregated structure of molecules. Although the ion is not particularly restricted, examples thereof include a cation of an alkali metal; a cation of an alkaline earth metal; a cation of a transition metal, such as zinc; an organic cation, such as an ammonium ion; and an anion, such as a halide ion.

Since the ethylene-modified PVA (A) is favorable in compatibility with the particle (B) as mentioned later, not only the dispersibility of the particle (B) in the emulsion as mentioned later is favorable, and in its turn, the dispersibility of the particle (B) in the film is excellent, but also both rigidity and elongation at sufficient levels can be made compatible with each other. As mentioned above, the content of the ethylene unit in the ethylene-modified PVA (A) is 0.5 to 19 mol % relative to all structural units. When the foregoing content is 0.5 mol % or more, the water resistance is favorable, and when it is 19 mol % or less, it is easy to prepare an aqueous solution or aqueous dispersion of the ethylene-vinyl alcohol copolymer.

From the same viewpoint, the content of the ethylene unit in the ethylene-vinyl alcohol copolymer is more preferably 1.5 to 15 mol %, still more preferably 2.0 to 12 mol %, and especially preferably 4.0 to 8.0 mol % relative to all structural units.

The content of the ethylene unit in the ethylene-modified PVA (A) can be determined through $^1$H-NMR measurement. For example, the foregoing content is determined through $^1$H-NMR measurement of an ethylene unit-containing vinyl ester-based copolymer that is a precursor or re-acetified product of the ethylene-modified PVA (A). In more detail, the vinyl ester-based copolymer is subjected to reprecipitation purification with a mixed liquid of n-hexane and acetone three or more times and then dried under reduced pressure at 80° C. for 3 days, to obtain a vinyl ester-based copolymer for analysis. This is dissolved in DMSO-$d_6$ and measured with a $^1$H-NMR analyzer (for example, at 500 MHz) at 80° C. The content of the ethylene unit is calculated using a peak (4.7 to 5.2 ppm) derived from the main-chain methine of the vinyl ester and peaks (0.8 to 1.6 ppm) derived from the main-chain methine of ethylene, the vinyl ester, and the third component.

The ethylene-modified PVA (A) contains a vinyl alcohol unit and an ethylene unit, and as the case may be, it contains a vinyl ester unit. The ethylene-modified PVA (A) may further contain other monomer unit or may not contain it. Although a compound constituting the other monomer unit is not particularly restricted, examples thereof include α-olefins, such as propylene, 1-butene, isobutene, and 1-hexene; unsaturated acids, such as acrylic acid, methacrylic acid, crotonic acid, maleic acid, maleic anhydride, and itaconic acid, or salts thereof, or monoalkyl esters or dialkyl esters of the aforementioned unsaturated acids; vinyl ethers, such as methyl vinyl ether, ethyl vinyl ether, n-propyl vinyl ether, isopropyl vinyl ether, and n-butyl vinyl ether; hydroxy group-containing vinyl ethers, such as ethylene glycol vinyl ether, 1,3-propanediol vinyl ether, and 1,4-butanediol vinyl ether; allyl ethers, such as allyl acetate, propyl allyl ether, butyl allyl ether, and hexyl allyl ether; oxyalkylene group-containing compounds; vinyl silyl compounds, such as vinyl trimethoxysilane; isopropenyl acetate; hydroxy group-containing α-olefins, such as 3-buten-1-ol, 4-penten-1-ol, 5-hexen-1-ol, 7-octen-1-ol, 9-decen-1-ol, and 3-methyl-3-buten-1-ol; sulfonic acid group-containing compounds derived from ethylene sulfonic acid, allyl sulfonic acid, methallyl sulfonic acid, 2-acrylamido-2-methylpropane sulfonic acid, or the like, or salts thereof; and cationic group-containing compounds derived from vinyloxyethyl trimethylammonium chloride, vinyloxybutyl trimethylammonium chloride, vinyloxyethyl dimethylamine, vinyloxymethyl diethylamine, N-acrylamidomethyl trimethylammonium chloride, 3-(N-methacrylamido)propyl trimethylammonium chloride, N-acrylamidoethyl trimethylammonium chloride, N-acrylamidodimethylamine, allyl trimethylammonium chloride, methallyl trimethylammonium chloride, dimethyl allylamine, allyl ethylamine, or the like. In the case where the ethylene-modified PVA (A) contains the other monomer unit, its content is preferably 20 mol % or less, and it may be 5 mol % or less, may be 1 mol % or less, and may be 0.5 mol % or less.

(Viscosity-Average Degree of Polymerization)

A viscosity-average degree of polymerization of the ethylene-modified PVA (A) [hereinafter occasionally abbreviated as "degree of polymerization"] is preferably 200 to 18,000. The degree of polymerization of the ethylene-modified PVA (A) is more preferably 300 to 15,000, still more preferably 300 to 10,000, yet still more preferably 300 to 5,000, especially preferably 300 to 3,000, and most preferably 500 to 2,000. In the case where the degree of polymerization of the ethylene-modified PVA is the aforementioned lower limit value or more, there is a tendency that the occurrence of a reduction of the strength as a composition can be suppressed. On the other hand, in the case where the degree of polymerization is the aforementioned upper limit value or less, the occurrence of an increase of the solution viscosity is suppressed, so that the moldability tends to be improved.

The degree of polymerization of the ethylene-modified PVA is a value measured by the method described in JIS K6726 (1994) "3.7 Average degree of polymerization".

(Degree of Saponification)

A degree of saponification of the ethylene-modified PVA (A) is preferably 50 mol % or more, more preferably 70 mol % or more, still more preferably 85 mol % or more, especially preferably 95 mol % or more, and most preferably 98 mol % or more. An upper limit of the degree of saponification of the ethylene-modified PVA (A) is not particularly limited, and it may be 100 mol %, and may be 99.8 mol %. When the degree of saponification is 50 mol % or more, the solubility in water becomes favorable, and it tends to become easy to prepare an aqueous solution or aqueous dispersion of the ethylene-modified PVA (A). By increasing the degree of saponification, the rigidity of the ethylene-modified PVA (A) tends to become high.

The degree of saponification is a value measured by the method described in JIS K6726 (1994) "3.5 Degree of saponification".

(Production Method of Ethylene-Modified PVA (A))

The production method of the ethylene-modified PVA (A) is not particularly restricted, and a general production method can be adopted. For example, the ethylene-modified PVA (A) can be produced by saponifying a copolymer of a vinyl ester and ethylene.

Examples of the vinyl ester include vinyl formate, vinyl acetate, vinyl propionate, vinyl versatate, and vinyl pivalate. Of these, vinyl acetate is preferred from the viewpoint of production cost.

The ethylene-modified PVA (A) may be one obtained by copolymerizing a vinyl ester and ethylene and further another monomer, or may be one obtained by modifying an end of the polymer with a chain transfer agent.

The another ethylenically unsaturated monomer is not particularly restricted so far as it is copolymerizable with the vinyl ester, and examples thereof include an α-olefin, a halogen-containing monomer, a carboxylic acid-containing monomer and an anhydride thereof, or an ester thereof, a (meth)acrylic acid ester, a vinyl ether, a sulfonic acid group-containing monomer, an amide group-containing monomer, an amino group-containing monomer, a quaternary ammonium base-containing monomer, a silyl group-containing monomer, a hydroxy group-containing monomer, and an acetyl group-containing monomer.

Examples of the chain transfer agent include aldehydes, such as acetaldehyde, propionaldehyde, butyl aldehyde, and benzaldehyde; ketones, such as acetone, methyl ethyl ketone, hexanone, and cyclohexanone; mercaptanes, such as 2-hydroxyethanethiol; thiocarboxylic acids, such as thioacetic acid; and halogenated hydrocarbons, such as trichloroethylene and perchloroethylene. Of these, aldehydes and ketones are preferred. In the case of using the chain transfer agent, though its use amount can be determined according to a chain transfer coefficient of the chain transfer agent used and the desired degree of polymerization of the ethylene-modified PVA (A) and is not particularly restricted, it is preferably 0.1 to 10 parts by mass based on 100 parts by mass of the vinyl ester.

Examples of the polymerization method include known methods, such as a block polymerization method, a solution polymerization method, a suspension polymerization method, an emulsion polymerization method, and a dispersion polymerization method. Of these, a solution polymerization method, an emulsion polymerization method, and a dispersion polymerization method are preferred from an industrial viewpoint. In the polymerization operation, any of a batch method, a semi-batch method, and a continuous method can be adopted.

Although a polymerization temperature is not particularly restricted, it is preferably 0 to 150° C., more preferably 20 to 150° C., and still more preferably 30 to 80° C.

By saponifying the thus obtained copolymer with a saponification catalyst, such as sodium hydroxide, and optionally, subjecting to a step, such as a pulverization step and a drying step, the ethylene-modified PVA (A) is obtained.

The ethylene-modified PVA (A) may be used in a state of a solution having been dissolved in water or the like, may be used in a state of a dispersion having been dispersed in water or the like, or may be used in a state where the both are intermingled.

<Particle (B)>

The composition of the present invention contains the particle (B) together with the ethylene-modified PVA (A). The particle (B) may be used alone or may be used in combination of two or more thereof.

In view of the fact that a predetermined amount of the particle (B) is contained together with the ethylene-modified PVA (A) in the composition of the present invention, in the case where the composition is applied with a stress, the stress is dispersed, and it becomes possible to make both rigidity and elongation at sufficient levels compatible with each other even under a low humidity, etc.

The particle (B) is preferably at least one selected from the group consisting of a polymer particle ($B^X$) and an inorganic particle ($B^Y$), and more preferably, at least the polymer particle ($B^X$) is contained, and still more preferably, the particle (B) is the polymer particle ($B^X$). However, it should be construed that the polymer particle ($B^X$) does not consist of the aforementioned ethylene-modified PVA (A) by itself.

(Average Particle Diameter)

Although an average particle diameter of the particle (B) is not particularly restricted, it is preferably 10 to 500 nm, more preferably 50 to 400 nm, still more preferably 50 to 300 nm, especially preferably 70 to 200 nm, and most preferably 70 to 140 nm. The foregoing average particle diameter may be 70 to 100 nm, or it may be 100 to 150 nm, may be 110 to 140 nm, and may be 110 to 130 nm. The average particle diameter is a median diameter determined by measuring the particle (B) existing in the aqueous dispersion with a dynamic light scattering measuring device according to the method described in the section of Examples. However, the average particle diameter of the particle (B) existing in the film, as determined by observing with a transmission electron microscope (TEM) according to the method described in the section of Examples also tends to become a value substantially the same as the average particle diameter measured by the dynamic light scattering measuring device, and therefore, it is preferred that the average particle diameter in this case falls within the aforementioned range.

While the aforementioned average particle diameter refers to a primary particle diameter of the particle (B), in the case where the particle (B) aggregates in the composition, coating, or film to form a secondary particle, a secondary particle diameter of the aggregated particle may be 20 to 15,000 nm, may be 40 to 10,000 nm, may be 100 to 8,000 nm, and may be 160 to 7,500 nm. However, an embodiment in which the particle (B) is not aggregated in the composition, coating, or film is preferred from the viewpoint of making both rigidity and elongation compatible with each other.

(Content of Particle (B))

The content of the particle (B) in the composition of the present invention is 1 part by mass or more and less than 100 parts by mass based on 100 parts by mass of the ethylene-modified PVA (A) from the viewpoint of making both rigidity and elongation at sufficient levels compatible with each other under a low humidity, etc. In addition, from the same viewpoint, the content of the particle (B) is preferably 1 to 50 parts by mass, more preferably 2 to 50 parts by mass, and still more preferably 3 to 40 parts by mass based on 100 parts by mass of the ethylene-modified PVA (A), and it may be 3 to 20 parts by mass, may be 3 to 15 parts by mass, and may be 3 to 10 parts by mass, or it may be 20 to 40 parts by mass, and may be 25 to 35 parts by mass.

The aforementioned content is corresponding to the content of the polymer particle ($B^X$) in the case where the particle (B) is the polymer particle ($B^X$); it is corresponding to the content of the inorganic particle ($B_Y$) in the case where the particle (B) is the inorganic particle ($B^Y$); and it is corresponding to the total content of the polymer particle ($B^X$) and the inorganic particle ($B^Y$) in the case of using a combination of the polymer particle ($B^X$) and the inorganic particle ($B^Y$) as the particle (B).

(Polymer Particle ($B^X$))

The polymer particle ($B^X$) may be composed of a homopolymer consisting of one kind of monomer unit or may be composed of a copolymer consisting of plural kinds of monomer units. In addition, the polymer particle ($B^X$) may be a polymer particle of a single-layer type (single particle) or may be a polymer particle of a core-shell type composed of a core and a shell covering at least a part of the core. In addition, the polymer particle ($B^X$) may be composed of an ionomer, and the ionomer is as mentioned above.

The polymer particle ($B^X$) may be used alone or may be used in combination of two or more thereof.

Although the polymer particle ($B^X$) is not particularly restricted, from the viewpoint of making both rigidity and elongation at sufficient levels compatible with each other under a low humidity, etc., the polymer particle ($B^X$) is preferably at least one selected from the group consisting of a (meth)acrylic acid ester-based polymer particle, a conjugated diene-based polymer particle, a styrene-based polymer particle, a styrene/conjugated diene-based copolymer particle, a urethane-based polymer particle, a vinyl acetate-based polymer particle, an ester-based polymer particle (provided that the aforementioned (meth)acrylic acid ester-based polymer particle and the aforementioned vinyl acetate-based polymer particle are excluded), an amide-based polymer particle, an imide-based polymer particle, a carbonate-based polymer particle, an allylate-based polymer particle, a sulfone-based polymer particle, and a phenoxy-based polymer particle, and more preferably a (meth)acrylic acid ester-based polymer particle.

The (meth)acrylic acid ester-based polymer particle is preferably at least one selected from the group consisting of a (meth)acrylic acid ester-based single-layer type polymer particle and a (meth)acrylic acid ester-based core-shell type polymer particle, and the (meth)acrylic acid ester-based single-layer type polymer particle is more preferably a (meth)acrylic acid ester-based homopolymer particle.

As for the polymer particle (B$^X$), an embodiment of containing the polymer (B1) containing an ethylenically unsaturated monomer (b 1) unit is also preferred from the viewpoint of making both rigidity and elongation at sufficient levels compatible with each other. The polymer particle (B$^X$) more preferably contains 50% by mass or more of the polymer (B1) containing the ethylenically unsaturated monomer (b1) unit, still more preferably contains 80% by mass or more of the polymer (B1) containing the ethylenically unsaturated monomer (b1) unit, especially preferably contains 90% by mass or more of the polymer (B1) containing the ethylenically unsaturated monomer (b1) unit, and most preferably contains substantially 100% by mass of the polymer (B1) containing the ethylenically unsaturated monomer (b1) unit, namely the polymer (B1) containing substantially the ethylenically unsaturated monomer (b1) unit.

A proportion of the ethylenically unsaturated monomer (b1) unit contained in the polymer (B1) is preferably 50% by mass or more, more preferably 60% by mass or more, still more preferably 80% by mass or more, yet still more preferably 90% by mass or more, and especially preferably 95% by mass or more.

The polymer particle (B$^X$) may contain other polymer than the polymer (B1) as the need arises. Examples of such other polymer include a PVA-based polymer. In the case where the polymer particle (B$^X$) contains the other polymer, its content is preferably 50% by mass or less, more preferably 40% by mass or less, still more preferably 20% by mass or less, yet still more preferably 10% by mass or less, and especially preferably 5% by mass or less. What no PVA-based polymer is contained in the polymer particle (B$^X$) is also one preferred embodiment.

The "ethylenically unsaturated monomer (b1)" is herein occasionally referred to simply as "monomer (b1)". In addition, the "polymer (B1) containing the ethylenically unsaturated monomer (b 1) unit" is occasionally referred to simply as "polymer (B1)".

In this specification, the wording "(meth)acrylic" means one or two selected from "acrylic" and "methacrylic". In addition, the "(N-alkyl) (meth)acrylamide" means one or more selected from "(meth)acrylamide" and "N-alkyl (meth)acrylamide", in other words, it is a general name of a compound in which the alkyl group is substituted on the nitrogen atom of the (meth)acrylamide and a compound in which no alkyl group is substituted on the nitrogen atom of the (meth)acrylamide.

(Ethylenically Unsaturated Monomer (B1))

Examples of the monomer (b 1) include (meth)acrylic acid and salts thereof; (meth)acrylic acid esters, such as methyl (meth)acrylate, ethyl (meth)acrylate, n-propyl (meth)acrylate, isopropyl (meth)acrylate, n-butyl (meth) acrylate, t-butyl (meth)acrylate, tricyclodecanyl (meth)acrylate, 2-phenoxyethyl (meth)acrylate, 3-(trimethoxysilyl)propyl (meth)acrylate, a hydroxyalkyl (meth)acrylate, an N,N'-dialkylaminoalkyl (meth)acrylate, a tri(meth)acrylic acid ester [for example, trimethylolpropane tri(meth)acrylate], and a tetra(meth)acrylic acid ester [for example, pentaerythritol tetra(meth)acrylate]; (N-alkyl) (meth)acrylamides, such as (meth)acrylamide, N-methyl (meth)acrylamide, and N-ethyl (meth)acrylamide; aromatic vinyl-based compounds, such as styrene, α-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and a halogenated styrene; vinyl cyanide-based compounds, such as acrylonitrile and meth acrylonitrile; conjugated diene-based compounds, such as butadiene, isoprene, 2,3-dimethylbutadiene, 2-methyl-3-ethylbutadiene, 1,3-pentadiene, 3-methyl-1,3-pentadiene, 2-ethyl-1,3-pentadiene, 1,3-hexadiene, 2-methyl-1,3-hexadiene, 3,4-dimethyl-1,3-hexadiene, 1,3-heptadiene, 3-methyl-1,3-heptadiene, 1,3-octadiene, cyclopentadiene, chloroprene, myrcene, and farnesene; aliphatic vinyl-based compounds, such as ethylene and isobutylene; esters between an unsaturated monocarboxylic acid and an unsaturated alcohol, such as allyl (meth)acrylate, methallyl (meth) acrylate, allyl cinnamate, methallyl cinnamate, diallyl maleate, diallyl phthalate, diallyl terephthalate, and diallyl isophthalate; diesters between an unsaturated monocarboxylic acid and a glycol, such as ethylene glycol di(meth) acrylate, butanediol di(meth)acrylate, and hexanediol di(meth)acrylate; polyfunctional aromatic vinyl compounds, such as divinylbenzene; and acetic acid vinyl esters, such as vinyl acetate.

The monomer (b1) may be used alone or may be used in combination of two or more thereof.

Among those exemplified above for the monomer (b1), from the viewpoint of making both rigidity and elongation at sufficient levels compatible with each other, (meth)acrylic acid esters, aromatic vinyl-based compounds, conjugated diene-based compounds, aliphatic vinyl-based compounds, and acetic acid vinyl esters are preferred; methyl methacrylate, ethyl acrylate, n-butyl acrylate, t-butyl acrylate, allyl methacrylate, tricyclodecanyl methacrylate, 2-phenoxyethyl acrylate, a trimethacrylic acid ester, 3-(trimethoxysilyl)propyl methacrylate, styrene, butadiene, isoprene, farnesene, ethylene, isobutylene, and vinyl acetate are more preferred; and n-butyl acrylate, t-butyl acrylate, allyl methacrylate, tricyclodecanyl methacrylate, a trimethacrylic acid ester (preferably, trimethylolpropane tri(meth)acrylate), 3-(trimethoxysilyl)propyl methacrylate, styrene, butadiene, ethylene, and vinyl acetate are still more preferred.

As for the monomer (b1), from the viewpoint of making both rigidity and elongation at sufficient levels compatible with each other under a low humidity, etc., an embodiment in which n-butyl acrylate, allyl methacrylate, tricyclodecanyl methacrylate, and a trimethacrylic acid ester (preferably, trimethylolpropane tri(meth)acrylate) are used in combination is also preferred.

Here, when the monomer (b1) is a (meth)acrylic acid ester, the polymer particle (B$^X$) is referred to as "(meth) acrylic acid ester-based polymer particle", and in particular, when the (meth)acrylic acid ester is only one kind, the polymer particle (B$^X$) is referred to as "(meth)acrylic acid ester-based homopolymer particle".

From the viewpoint of making both rigidity and elongation at sufficient levels compatible with each other, the polymer particle (B$^X$) is preferably a single-layered polymer particle. The polymer particle (B$^X$) may contain a dispersant to be used on the occasion of production. In more detail, at least a part of the polymer particle (B$^X$) may be covered with the dispersant, or the whole thereof may be covered with the dispersant. In the case where the polymer particle (B$^X$) is of a single layer, it should be construed that even the state of containing the dispersant as mentioned above is considered to be a single layer.

From the viewpoint of making both rigidity and elongation at sufficient levels compatible with each other and the viewpoint of dispersibility of an emulsion, as mentioned later, the dispersant is preferably a dispersant containing an ionic group. The ionic group is preferably at least one selected from the group consisting of an anionic group and a group composed of a salt of an anionic group, and therefore, the dispersant is more preferably an anionic surfactant. Examples of the anionic group include a sulfonic acid group and a carboxy group. In addition, examples of the salt include a sodium salt.

In particular, since the component (A) is the ethylene-modified PVA, when the dispersant is a dispersant containing an ionic group, the composition in which the aggregation of the polymer particle ($B^X$) is effectively suppressed can be formed, and a much more improvement effect regarding the rigidity and the elongation tends to be obtained.

(Number Average Molecular Weight (Mn))

From the viewpoint of making both rigidity and elongation at sufficient levels compatible with each other, a number average molecular weight of the polymer particle ($B^X$) is preferably 5,000 or more, more preferably 5,000 to 150,000, still more preferably 8,000 to 120,000, yet still more preferably 10,000 to 100,000, especially preferably 15,000 to 80,000, and most preferably 20,000 to 50,000.

Here, the number average molecular weight is a value expressed in terms of standard polystyrene as measured by the gel permeation chromatography (GPC), and in detail, it is a value measured according to the measurement method described in the section of Examples.

From the viewpoint of making both rigidity and elongation at sufficient levels compatible with each other, the polymer particle ($B^X$) preferably contains a polymer having a glass transition temperature (Tg) of 40° C. or less, more preferably contains a polymer having a Tg of –100 to 25° C., still more preferably contains a polymer having a Tg of –100 to 15° C., yet still more preferably contains a polymer having a Tg of –70 to 10° C., even yet still more preferably contains a polymer having a Tg of –70 to 0° C., even still more preferably contains a polymer having a Tg of –70 to –10° C., especially preferably contains a polymer having a Tg of –65 to –35° C., and most preferably contains a polymer having a Tg of –60 to –50° C. The polymer particle ($B^X$) may consist of a polymer having a Tg of 40° C. or lower (more preferably as mentioned above) by itself.

In the case where the polymer particle ($B^X$) is a core-shell particle, it is preferred that at least one of the core and the shell contains a polymer having a Tg of 40° C. or lower (more preferably as mentioned above).

Here, in the present invention, the Tg is a value determined according to the method described in the section of Examples.

<Production Method of Polymer Particle ($B^X$)>

As for the polymer particle ($B^X$), a commercially available product can be used, and it can also be produced.

The polymer particle ($B^X$) is not particularly limited with respect to the production method, and for example, it can be produced utilizing an emulsion polymerization method. Examples of a monomer to be provided for the polymerization method include the aforementioned ethylenically unsaturated monomer (b1).

The emulsion polymerization method can be, for example, carried out by heating water containing a dispersant while stirring and adding a polymerization initiator and a monomer.

(Dispersant)

Although the dispersant is not particularly restricted, examples thereof include anionic surfactants, such as a sodium alkylbenzene sulfonate, sodium lauryl sulfate, polyoxyethylene lauryl ether acetate, polyoxyethylene lauryl ether sodium sulfate, polyoxyethylene polyoxypropylene lauryl ether sodium sulfate, a higher fatty acid sodium, and a rosin-based soap; nonionic surfactants, such as a polyoxyethylene alkyl ether and nonyl phenol ethoxylate; cationic surfactants, such as distearyl dimethyl ammonium chloride and benzalkonium chloride; and amphoteric surfactants, such as cocamidopropyl betaine and cocamidopropyl hydroxysultaine.

It is also possible to use, as the dispersant, polymer surfactants, such as a PVA-based polymer, an acid-modified polyolefin, a ß-naphthalene sulfonic acid formalin condensate salt, and an ethyl (methacrylate) copolymer.

In the present invention, from the viewpoint of making both rigidity and elongation at sufficient levels compatible with each other, the dispersant is preferably a dispersant containing an ionic group. The ionic group is preferably at least one selected from the group consisting of an and a group composed of a salt thereof, and the aforementioned anionic surfactant is exemplified. Examples of the anionic group include a sulfonic acid group and carboxy group. In addition, examples of the aforementioned salt include a sodium salt.

The dispersant may be used alone or may be used in combination of two or more thereof.

The use amount of the dispersant is preferably 0.01 to 40% by mass, and more preferably 0.05 to 30% by mass relative to the dispersion medium.

(Polymerization Initiator)

In the emulsion polymerization method, a radical polymerization initiator can be preferably used as the polymerization initiator.

Examples of the radical polymerization initiator include a persulfate-based polymerization initiator, a peroxide-based polymerization initiator, a water-soluble azo-based polymerization initiator, and an oil-soluble azo-based polymerization initiator. In addition, a redox-based polymerization initiator may be used as the radical polymerization initiator. Of these, a persulfate-based polymerization initiator and a peroxide-based polymerization initiator are preferred. Examples of the persulfate-based polymerization initiator include potassium persulfate, sodium persulfate, and ammonium persulfate. Examples of the peroxide-based polymerization initiator include hydrogen peroxide, t-butyl peroxide, and methyl ethyl ketone peroxide.

The polymerization initiator may be used alone or may be used in combination of two or more thereof.

In the case of using a water-soluble polymerization initiator, it may be added as an aqueous solution thereof, whereas in the case of using a water-sparingly soluble polymerization initiator, it is preferred that a dispersion of the radical polymerization initiator is previously prepared using water and a dispersant and then added. In this case, the dispersant to be used may be the same as or different from that used for the emulsion polymerization.

The use amount of the polymerization initiator is preferably 0.0001 to 1% by mass, more preferably 0.001 to 0.5% by mass, and still more preferably 0.001 to 0.1% by mass relative to the dispersion medium.

In the emulsion polymerization method, from the viewpoint of productivity, a redox-based polymerization initiator may be used. As for the redox-based polymerization initiator, a combination of an organic peroxide and a transition metal salt is preferably used.

Examples of the organic peroxide include benzoyl peroxide, n-propyl peroxycarbonate, t-butyl peroxide, and methyl ethyl ketone peroxide.

Examples of the transition metal salt to be used in combination with the organic peroxide include iron compounds, such as iron(II) sulfate, iron(II) thiosulfate, iron(II) carbonate, iron(II) chloride, iron(II) bromide, iron(II) iron(II) hydroxide, and iron(II) oxide; copper compounds, such as copper(I) sulfate, copper(I) thiosulfate, copper(I) carbonate, copper(I) chloride, copper(I) bromide, copper(I) iodide, copper(I) hydroxide, and copper(I) oxide; and hydrates thereof.

(Reducing Agent)

A reducing agent may be used together with the radical polymerization initiator. Examples of such a reducing agent include iron compounds, such as ferrous chloride and ferrous sulfate; sodium salts, such as sodium hydrogen sulfate, sodium bisulfite, sodium sulfite, sodium hydrogen sulfite, and sodium hydrogen carbonate; and organic reducing agents, such as ascorbic acid, rongalite, sodium dithionite, triethanolamine, glucose, fructose, glyceryl aldehyde, lactose, arabinose, and maltose. Of these, the iron compound and the organic reducing agent may be used in combination.

The use amount of the reducing agent is preferably 0.0001 to 1% by mass, more preferably 0.001 to 0.5% by mass, and still more preferably 0.005 to 0.1% by mass relative to the dispersion medium.

(Crosslinking Agent)

In the emulsion polymerization method, a crosslinking agent may be added as the need arises. Even in the aforementioned monomer (hi), one having a crosslinking performance is occasionally referred to as the crosslinking agent.

As for the crosslinking agent, a bifunctional monomer having two polymerizable groups is suitably used. However, it is also possible to regulate dynamic physical properties and so on by using a polyfunctional monomer having a trifunctional or higher functionality to increase a width of coarseness and fineness of the crosslinking density within the polymer. In the case of using a conjugated diene-based compound, such as butadiene and isoprene, for the whole or a part of the monomer (b1), an unsaturated double bond remains after the polymerization, and therefore, this can be allowed to work as a crosslinking part.

Examples of the crosslinking agent include allyl acrylate, allyl methacrylate, ethylene glycol di(meth)acrylate, triethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, tripropylene glycol di(meth)acrylate, an adduct of (meth)acrylic acid of bisphenol A diglycidyl ether at both ends, pentaerythritol tri(meth)acrylate, pentaerythritol tetra(meth)acrylate, polyester di(meth)acrylate, tris(2-hydroxyethyl)isocyanurate tri(meth)acrylate, tris(2-(2,3-dihydroxypropoxy)ethyl)isocyanurate tri(meth)acrylate, tris(2-hydroxyethyl)isocyanurate di(meth)acrylate, cyclohexane dimethanol di(meth)acrylate, tricyclodecane dimethanol di(meth)acrylate, di(meth)acrylate of a diol which is an adduct of ethylene oxide or propylene oxide of bisphenol A, di(meth)acrylate of a diol which is an adduct of ethylene oxide or propylene oxide of hydrogenated bisphenol A, trimethylolpropane tri(meth)acrylate, and trimethylolpropane trioxyethyl (meth)acrylate. Of these, allyl methacrylate and trimethylolpropane trimethacrylate are preferred.

The crosslinking agent may be used alone or may be used in combination of two or more thereof.

(Grafting Agent)

In the emulsion polymerization method, a grafting agent may be added as the need arises. Even in the aforementioned monomer (b 1), one having a grafting performance is occasionally referred to as the grafting agent.

Examples of the grafting agent include maleic acid, maleic anhydride, a metal salt of monoethyl maleate, fumaric acid, a metal salt of monoethyl fumarate, itaconic acid, vinyl benzoate, vinyl phthalate, methacrylic acid, 3-(trimethoxysilyl)propyl methacrylate, maleic acid, and a monoester or diester of fumaric acid or itaconic acid. Examples of the monoester or diester include a methyl monoester, a methyl diester, a propyl monoester, a propyl diester, an isopropyl monoester, an isopropyl diester, a butyl monoester, a butyl diester, an isobutyl monoester, an isobutyl diester, a hexyl monoester, a hexyl diester, a cyclohexyl monoester, a cyclohexyl diester, an octyl monoester, an octyl diester, a 2-ethylhexyl monoester, a 2-ethylhexyl diester, a decyl monoester, a decyl diester, a stearyl monoester, a stearyl diester, a methoxyethyl monoester, a methoxyethyl diester, an ethoxyethyl monoester, an ethoxyethyl diester, a hydroxymonoester, a hydroxydiester, an ethyl monoester, and an ethyl diester.

(Metal Ion Chelating Agent)

In the emulsion polymer method, a metal ion chelating agent may be added as the need arises. Specifically, examples thereof include metal ion chelating agents, such as disodium dihydrogen ethylenediaminetetraacetate.

(Thickening Inhibitor)

In the emulsion polymerization method, an electrolyte may be added as a thickening inhibitor within the system of emulsion polymerization as the need arises. Specifically, examples thereof include electrolytes, such as sodium chloride, sodium sulfate, and trisodium phosphate.

In the case of using the dispersant and the thickening inhibitor in combination, though the use amount of the thickening inhibitor is not particularly restricted, it is preferably 20% by mass or less, more preferably 10% by mass or less, and still more preferably 5% by mass or less relative to the dispersant from the viewpoint of stability of a micelle in the dispersion.

As for the aforementioned reducing agent, metal ion chelating agent, and electrolyte, in the case of using them, though they may be added on the way of the polymerization reaction, they are preferably added in water from the beginning of the emulsion polymerization.

(Chain Transfer Agent)

In the emulsion polymerization method, a chain transfer agent may be added as the need arises. In particular, in the present invention, by adding the chain transfer agent, the degree of polymerization can be regulated. Examples of the chain transfer agent include hydrocarbon-based mercaptans, such as n-octyl mercaptan, n-dodecyl mercaptan, t-dodecyl mercaptan, hexadecyl mercaptan, and n-octadecyl mercaptan; thiols (exclusive of the aforementioned hydrocarbon-based mercaptans), such as mercaptoacetic acid, 2-ethylhexyl mercaptoacetate, 3-methoxybutyl mercaptoacetate, 6-mercaptopropionic acid, methyl 6-mercaptopropionate, 2-ethylhexyl 6-mercaptopropionate, 3-methoxybutyl 6-mercaptopropionate, 2-mercaptoethanol, and 3-mercapto-1,2-propanediol; and hydrocarbon compounds having a large chain transfer constant, such as an α-methylstyrene Of these, hydrocarbon-based mercaptans are preferred, and n-dodecyl mercaptan and t-dodecyl mercaptan are more preferred.

The chain transfer agent may be used alone or may be used in combination of two or more thereof.

In the case of using the chain transfer agent, though its use amount is not particularly restricted, it is preferably 0.01 to 10% by mass, and more preferably 0.1 to 2% by mass relative to the charge amount of the monomer (b1) to be used for production of the polymer particle ($B^x$).

(Dispersion Medium)

The dispersion medium is preferably an aqueous medium composed mainly of water. The aqueous medium composed mainly of water may contain a water-soluble organic solvent (e.g., alcohols and ketones) which is soluble in water in an arbitrary proportion. Here, the "aqueous medium composed mainly of water" indicates a dispersion medium containing 50% by mass or more of water. From the viewpoint of production cost and environmental load, the dispersion medium is preferably an aqueous medium containing 90% by mass or more of water, and more preferably water.

The amount of the dispersion medium to be used for the emulsion polymerization method is preferably 50 to 2,000 parts by mass, more preferably 80 to 1,500 parts by mass, and still more preferably 100 to 1,200 parts by mass based on 100 parts by mass of the total amount of the monomer (b1) to be used for production of the polymer particle ($B^X$) from the viewpoint of viscosity and stability of the emulsion.

(Anti-Aging Agent)

In the present invention, an anti-aging agent may be added in the dispersion after the emulsion polymerization or in the polymer particle ($B^X$) after the recovery treatment or purification treatment from the viewpoint of suppressing the degradation of the polymer particle ($B^X$). As for the anti-aging agent, from the viewpoint of suppressing degradation in the recovery treatment and purification treatment of the polymer particle ($B^X$) after the polymerization reaction, after adding the anti-aging agent in the dispersion after the emulsion polymerization, the polymer particle ($B^X$) may be subjected to a recovery treatment or a purification treatment.

As for the anti-aging agent, general materials can be used.

Specifically, examples of the anti-aging agent include phenol-based compounds, such as hydroquinone, hydroquinone monomethyl ether, 2,5-di-t-butylphenol, 2,6-di(t-butyl)-4-methylphenol, and mono-(or di- or tri-)(α-methylbenzyl)phenol; bisphenol-based compounds, such as 2,2'-methylenebis(4-methyl-6-t-butylphenol), 4,4'-butylidenebis(3-methyl-6-t-butylphenol), and 4,4'-thiobis(3-methyl-6-t-butylphenol); benzimidazole-based compounds, such as 2-mercaptobenzimidazole and 2-mercaptomethylbenzimidazole; amine-ketone-based compounds, such as 6-ethoxy-1,2-dihydro-2,2,4-trimethylquinoline, a reaction product between diphenylamine and acetone, and 2,2,4-trimethyl-1,2-dihydroquinoline polymer; aromatic secondary amine-based compounds, such as N-phenyl-1-naphtylamine, an alkylated diphenylamine, octylated diphenylamine, 4,4'-bis(α,α-dimethylbenzyl)diphenylamine, p-(p-toluenesulfonylamido)diphenylamine, and N,N'-diphenyl-p-phenylenediamine; and thiourea-based compounds, such as 1,3-bis(dimethylaminoprop yl)-2-thiourea and tributylthiourea.

The anti-aging agent may be used alone or may be used in combination of two or more thereof.

(Polymerization Temperature)

In general, a polymerization temperature is preferably 0 to 110° C., and from the viewpoint of increasing a rate of polymerization, it is more preferably 20 to 100° C., and still more preferably 60 to 100° C.

(Inorganic Particle ($B^Y$))

Examples of the inorganic particle ($B^Y$) include inorganic fillers, such as precipitated silica, gelled silica, gas phase process silica, colloidal silica, colloidal alumina, aluminum hydroxide, pseudo-boehmite, clay, talc, diatomaceous earth, zeolite, calcium carbonate, alumina, zinc oxide, and satin white.

The inorganic particle ($B^Y$) may be used alone or may be used in combination of two or more thereof.

<Other Component Than Ethylene-Modified PVA (A) and Particle (B)>

The composition of the present invention may contain other component than the ethylene-modified PVA (A) and the particle (B) so long as the effects of the present invention are not hindered. Examples of the other component include a polymer (C) not corresponding to the ethylene-modified PVA (A) and the polymer particle ($B^X$) and an additive (D).

Examples of the polymer (C) include a thermoplastic resin and a thermoplastic elastomer. More specifically, examples thereof include an ionomer, a polyester-based resin, a polystyrene-based resin, a polyamide-based resin, a polyolefin-based resin, a polyvinyl chloride-based resin, a polycarbonate-based resin, an acrylic resin, an ethylene-acrylic acid copolymer, an ethylene-acrylic acid ester copolymer, an ethylene-methacrylic acid copolymer, an ethylene-methacrylic acid ester copolymer, an ethylene-vinyl acetate-based copolymer, a polyvinylidene chloride, a vinyl ester-based resin, a polyester-based elastomer, a polyurethane-based elastomer, and a chlorinated polyolefin. However, all of them are limited to those not corresponding to the ethylene-modified PVA (A) and the polymer particle ($B^X$).

Examples of the additive (D) include a plasticizer, an oxygen absorber, a heat stabilizer, a light stabilizer, an ultraviolet absorber, a coloring agent, an antistatic agent, a surfactant, an antibacterial agent, an antiblocking agent, a filler, and an antiseptic. The additive (D) may be one contained in the composition by being added separately from the ethylene-modified PVA (A) and the particle (B) or may be one which is used on the occasion of production of the ethylene-modified PVA (A) or the polymer particle ($B^X$) and as a result, is contained in the composition.

In the case where the composition of the present invention contains the aforementioned other component, it is preferred that the effects of the present invention are not hindered, and its content (here, excluding the content of the additive used on the occasion of production of the ethylene-modified PVA (A) or the polymer particle ($B^X$)) is preferably 50% by mass or less, more preferably 30% by mass or less, still more preferably 10% by mass or less, and especially preferably 5% by mass or less. Although a lower limit value of the foregoing content is not particularly restricted, for example, it may be 1% by mass, and may be 3% by a mass.

<Preparation Method of Composition>

Although the preparation method of the composition of the present invention is not particularly restricted, the composition (hereinafter occasionally referred to as "emulsion") is, for example, obtained by mixing the ethylene-modified PVA (A) and the aqueous solution or aqueous dispersion of the particle (B) and then optionally regulating the concentration. At this time, the emulsion may also be prepared by mixing together with the aforementioned other component after being formed in a state of a dispersion as required.

The solid component amount in the composition is preferably 1 to 60% by mass, more preferably 2 to 30% by mass, and still more preferably 3 to 15% by mass. Here, the "solid component amount" in the composition means the total mass of the components excluding the dispersion medium among the components constituting the composition.

[Coating and Film]

The present invention also provides a coating and a film each formed of the aforementioned composition. Although the production method of the film is not particularly restricted, examples thereof include a solution casting method (solvent casting method), a melt extrusion method, a calendering method, a compression molding method, and an injection molding method. In the case of producing a film by the solution casting method, when hot air is used for drying, the surface is dried, whereby the film is formed, and therefore, not only irregular drying is generated, but also a problem, such as bubble biting, is liable to be generated. Accordingly, it is desired that the aforementioned composition is cast on a glass sheet or a plastic film to form a coating, followed by forming into a film by air drying. In the case of performing the air drying, though a drying time thereof is not particularly restricted, it is preferably 12 hours to 4 days, and more preferably 1 day to 3 days. In the present invention, the coating having been thoroughly dried before drying is occasionally referred to as "film", it may also be a coating itself which has already been thoroughly dried.

The thickness of the coating (thickness after drying) and the thickness of the film are not particularly restricted, and it may be appropriately regulated according to the application. For example, it is preferably 30 to 200 μm, and it may be 40 to 100 μm, and may be 40 to 60 μm.

The coating and the film of the present invention may be non-oriented, may be uniaxially oriented, or may be biaxially oriented. However, a non-oriented coating or film is preferred from the viewpoint of rigidity and elongation under a low humidity. The non-oriented film is occasionally referred to as "cast film".

From the viewpoint of the effects of the present invention, the total content of the ethylene-modified PVA (A) and the particle (B) in each of the coating and the film of the present invention is preferably 50% by mass or more, more preferably 70% by mass or more, and still more preferably 90% by mass or more, and it may be substantially 100% by mass. (Physical Properties of Coating and Physical Properties of Film)

In the coating (coating after drying) and the film of the present invention, both the rigidity and the elongation are made compatible with each other at sufficiently high levels even under a low humidity, etc. For example, the elastic modulus (initial elastic modulus) measured according to the method described in the section of Examples tends to become 20 MPa or more, it becomes even 22 to 45 MPa, and it tends to become even 24 to 43 MPa. On the other hand, the yield stress measured according to the method described in the section of Examples tends to become 45 MPa or more, it becomes even 45 to 90 MPa, and it becomes even 47 to 90 MPa, and in a more preferred film, it becomes even 55 to 90 MPa, and it tends to become even 60 to 90 MPa. In this way, the coating (coating after drying) and the film of the present invention are large in the elastic modulus and the yield stress and excellent in the rigidity. In addition, an elongation at break measured according to the method described in the section of Examples tends to become 120% or more, and it becomes even 130 to 400%, and in a more preferred film, it becomes even 140 to 400%, it becomes even 150 to 400%, it becomes even 160 to 400%, it becomes even 170 to 400%, it becomes even 200 to 400%, and it tends to become even 230 to 380%, and it is excellent in the elongation.

[Base Material]

The present invention also provides a base material having the coating or film of the present invention. Examples of the base material include a glass sheet, a paper, and a plastic film. Although the base material having the coating or film is not particularly restricted, it can be produced by a method of coating the composition of the present invention on the base material or other method, and a known method may be adopted without limitation. For example, the composition may be coated on the base material by using a coating machine, such as a size press, a Sym-Sizer, a gate roll coater, a bar coater, and a curtain coater, followed by drying, or the composition may be cast on the base material by the solution casting method, followed by air drying. In this way, the base material having the coating or film laminated thereon can be obtained.

<Application>

The composition of the present invention can be suitably used as the coating or film, and in addition thereto, it can also be suitably used for applications, such as an adhesive, a fiber processing agent, a binder, a coating agent, an ink, and a paint. In addition, since in the film formed of the composition of the present invention, both the rigidity and the elongation are made compatible with each other at high levels, it is useful as various films, such as a wrapping film, a protective film, an oxygen gas barrier film, and a vapor barrier film.

EXAMPLES

The present invention is hereunder more specially described by reference to Examples and Comparative Examples, but it should be construed that the present invention is not limited to these Examples.

All ion-exchanged waters used in the respective Examples are ion-exchanged water having an electrical conductivity of $0.08 \times 10^{-1}$ S/m or less.

Various analysis conditions and evaluation methods in the respective Examples are shown below.
(1) Glass Transition Temperature (Tg) of Polymer Particle ($B^X$)

As for the glass transition temperature [hereinafter occasionally abbreviated as Tg] of the polymer contained in the polymer particle (WO, values of respective polymer components described in "Polymer Hand Book (John Wiley & Sons Inc.)" were used.

In the case of a multi-component copolymer contained in the polymer particle ($B^X$), or the case of using a polymer component not described in "Polymer Hand Book (John Wiley & Sons Inc.)", after a solid component was taken out from a solution containing the obtained polymer particle ($B^X$) and thoroughly dried, the Tg was determined with a differential scanning calorimeter by the method described in JIS K6240 (2011).

Device: Differential scanning calorimetry analyzer "DSC822" (manufactured by METTLER TOLEDO)

Measurement condition: Temperature rise rate=10° C./min
(2) Average Particle Diameter of Polymer Particle ($B^X$)

A mixed liquid of the dispersion (0.1 mL) of the polymer particle ($B^X$) obtained in each of the Examples and ion-exchanged water (10 mL) was measured for particle size distribution of the particle on a volume basis by using a dynamic light scattering measuring device (device name: nano Partica SZ-100, manufactured by Horiba, Ltd.), and the obtained median diameter was defined as the average particle diameter (average dispersion particle diameter) of the polymer particle ($B^X$).
(3) Number Average Molecular Weight (Mn) of Polymer Particle ($B^X$)

A dispersion of the polymer particle ($B^X$) obtained in each of the Examples was completely dried up; subsequently, the obtained solid component was dissolved in tetrahydrofuran (THF) to regulate the solid component amount to 10 mg/mL; and then, a filtrate from which an insoluble matter had been filtered off with a membrane filter ("13JP020AN, manufactured by Toyo Roshi Kaisha, Ltd.) was measured by the gel permeation chromatography (GPC) under the following condition, thereby calculating the number average molecular weight as expressed in terms of standard polystyrene.

Device: CO-8020, manufactured by Tosoh Corporation
Eluent: THF

Column: Four columns in total of one column of TSK-guardcolumn $H_{HR}$-H (46 mm I.D.×4 cm), manufactured by Tosoh Corporation, two columns of TSKgel GMH$_{HR}$-M (7.8 mm I.D.×30 cm), manufactured by Tosoh Corporation, and one column of TSKgel G2000H$_{HR}$ (7.8 mm I.D.×30 cm), manufactured by Tosoh Corporation were connected in series.

Column temperature: 40° C.

Detector: RI

Liquid feed amount: 1.0 mL/min (4) Physical Properties of Film

A sample film (No. 1 dumbbell having a thickness of 0.04 mm) was prepared from the film prepared in each of the Examples, and gauge points were provided at a gauge length of about 10 mm. When the obtained sample film was subjected to humidification in an environment at 23° C. and 43% RH and stretched at a rate of 100 mm/min by using a tensile tester (5566, manufactured by Instron Japan Co., Ltd.), the initial elastic modulus (strain range of from 0.05% to 0.25%), the yield stress or resilience, and the elongation at break were measured.

The elongation at break was determined by measuring the gauge length by using a camera. The elongation at break was defined as an index of the elongation while defining the initial elastic modulus and the yield stress as an index of the rigidity.

With respect to a film which could not be confirmed for the yield stress, a stress at a point of intersection on the extension of a portion close to the straight line before and after a point at which an inclination first changed largely on the stress-strain curve was referred to as the resilience and defined as an index of the rigidity in place of the yield stress. The larger the initial elastic modulus and the yield stress (or resilience), the more excellent the rigidity is, and the larger the elongation at break, the more excellent the elongation is.

(5) Dispersibility

The state of the dispersion after mixing the emulsion obtained in each of the Examples and Comparative Examples by using a shaker and then allowing to stand at room temperature for 2 hours, and the state of the cast film obtained in each of the Examples and Comparative Examples were visually observed and evaluated according to the following criteria.

A: The aggregation of the particle in the dispersion and the cast film is not observed, and the dispersibility is excellent.

B: Although the aggregation of the particle in the dispersion is not observed, the phase separation in the cast film is observed, and the dispersibility is poor.

C: The particle in the dispersion is aggregated, and the dispersibility is poor.

Production Example 1

(Production of Ethylene-Modified PVA-1)

In a pressurized reaction tank equipped with a stirrer, a nitrogen-introducing port, an ethylene-introducing port, and an initiator-adding port, 110.5 of vinyl acetate and 39.1 g of methanol were charged, and after raising the temperature to 60° C., the inside of the system was purged with nitrogen for 30 minutes by means of nitrogen bubbling. Subsequently, ethylene was introduced such that the reaction tank pressure became 0.14 MPa. 2,2'-Azobis(4-methoxy-2,4-dimethyl-valeronitrile) [hereinafter occasionally referred to as "AMV"] as the polymerization initiator was dissolved in methanol to prepare a solution having a concentration of 0.33 g/L, which was then purged with nitrogen by means of bubbling with a nitrogen gas. After regulating the internal temperature of the reaction tank to 60° C., 635.7 mL of the aforementioned initiator solution was injected thereinto, to commence the reaction.

During the polymerization, ethylene was introduced to regulate the reaction tank pressure to 0.61 MPa, the polymerization temperature was kept at 60° C., and AMV was continuously added at a rate of 2.0 L/hr by using the aforementioned initiator solution, to perform the polymerization. After 5 hours, when a polymerization rate became 35%, 2.22 g of sorbic acid was added, followed by cooling to terminate the polymerization.

The reaction tank was opened to remove the ethylene, and then, a nitrogen gas was further bubbled. Subsequently, an unreacted vinyl acetate monomer was removed under reduced pressure, to prepare a methanol solution of ethylene-modified polyvinyl acetate [the polyvinyl acetate will be hereinafter occasionally referred to as "PVAc"]. To 400 g of a methanol solution of ethylene-modified PVAc whose concentration was regulated to 25% by mass by further adding methanol to the methanol solution of the resulting ethylene-modified PVAc (100 g of ethylene-modified PVAc in the solution), 93.0 g of an alkaline solution (methanol solution containing 10% by mass of sodium hydroxide; molar ratio to the vinyl acetate unit in the ethylene-modified PVAc; 0.20) was added, and a saponification reaction was performed at 60° C. After the alkali addition, a gelled material was pulverized with a pulverizer and subjected to a saponification reaction for 1 hour in total. Then, 1,000 g of methyl acetate was added to neutralize the remaining alkali. After confirming the completion of neutralization using a phenolphthalein indicator, the ethylene-modified PVA as a white solid obtained through filtration was added with 1,000 g of methanol, followed by standing and washing at room temperature for 3 hours. After the washing operation was repeated three times, the ethylene-modified PVA obtained through centrifugal dehydration was dried by allowing to stand in a dryer at 70° C. for 2 days. There was thus obtained an ethylene-vinyl alcohol copolymer (referred to as "Ethylene-Modified PVA-1") in which the content of the ethylene unit determined by the following measurement method was 6 mol %, the degree of polymerization was 1,000, the degree of saponification was 99.0 to 99.4 mol %, and the Tg was 70° C.

The aforementioned degree of polymerization was measured by the method described in JIS K6726 (1994) "3.7 Average degree of polymerization".

(Measurement Method of the Content of Ethylene Unit)

The content of the ethylene unit was determined through $^1$H-NMR measurement of the ethylene-modified PVAc that is a precursor of the Ethylene-Modified PVA-1. In more detail, the ethylene-modified PVAc was subjected to reprecipitation purification with a mixed liquid of n-hexane and acetone three times or more and then dried under reduced pressure at 80° C. for 3 days, to obtain the ethylene-modified PVAc for analysis. This was dissolved in DMSO-d$_6$, and the solution was measured with a $^1$H-NMR analyzer (500 MHz) at 80° C. The content of the ethylene unit was determined using a peak (4.7 to 5.2 ppm) derived from the main-chain methine of the vinyl ester and peaks (0.8 to 1.6 ppm) derived from the main-chain methylene of ethylene, the vinyl ester, and the third component.

Production Example 2

(Production of PVA-2; Unmodified PVA)

In a reaction tank equipped with a stirrer, a nitrogen-introducing port, and an initiator-adding port, 0.59 kg of vinyl acetate and 1.0 kg of methanol were charged, and after raising the temperature to 60° C., the inside of the system was purged with nitrogen for 30 minutes by means of nitrogen bubbling. Subsequently, 2,2'-azobis(isobutyronitrile) (AIBN) as the polymerization initiator was dissolved in methanol to prepare a solution having a concentration of 10% by mass, which was then purged with nitrogen by means of bubbling with a nitrogen gas. After regulating the internal temperature of the reaction tank to 60° C., 10 mL of the aforementioned initiator solution was injected thereinto, to commence the reaction.

After 3 hours, when the degree of polymerization became 50%, 0.1 g of 2,4-diphenyl-4-methyl-1-pentene was added, followed by cooling to terminate the polymerization. The unreacted vinyl acetate monomer was removed to provide a methanol solution of PVAc. To 400 g of a methanol solution of PVAc whose concentration was regulated to 40% by mass by further adding methanol to the methanol solution of the resulting methanol solution of PVAc (160 g of PVAc in the solution), 7.44 g of an alkaline solution (methanol solution containing 10% by mass of sodium hydroxide; molar ratio to the vinyl acetate unit in PVAc:0.01) was added, and a saponification reaction was performed at 40° C. After the alkali addition, a gelled material was pulverized with a pulverizer and subjected to a saponification reaction for 1 hour in total. Then, 1,000 g of methyl acetate was added to neutralize the remaining alkali. After confirming the completion of neutralization using a phenolphthalein indicator, the PVA as a white solid obtained through filtration was added with 1,000 g of methanol, followed by standing and washing at room temperature for 3 hours. After the washing operation was repeated three times, the PVA obtained through centrifugal dehydration was dried by allowing to stand in a dryer at 70° C. for 2 days. There was thus obtained unmodified PVA (referred to as "PVA-2") in which the degree of polymerization was 1,750, and the degree of saponification was 88.4 mol %.

Production Example 3

(Production of Dispersant I)

5 parts by mass of "KAO AKYPO (AKYPO is a registered trademark) RLM100" (main ingredient: polyoxyethylene lauryl ether acetate, manufactured by Kao Corporation) and 10 parts by mass of ion-exchanged water were put in a vessel, 0.55 parts by mass of sodium hydroxide was charged while stirring, and the contents were thoroughly stirred at room temperature to obtain Dispersion I.

(Production of Dispersant I Containing Polymer Particle 1)

5.8 parts by mass of Dispersant I was put in a reaction vessel equipped with a reflux tube, 143 parts by mass of ion-exchanged water was then added, and the contents were subjected to a deoxidation treatment at room temperature for 30 minutes by bubbling with a nitrogen gas, followed by raising the temperature to 70° C. Thereafter, 1.51 parts by mass of a potassium persulfate aqueous solution obtained by previously dissolving 0.1 parts by mass of potassium persulfate (polymerization initiator) in 30 parts by mass of ion-exchanged water in another vessel and performing a deoxidation treatment by the same method as mentioned above was added.

Subsequently, n-butyl acrylate (dealt with the deoxidation treatment) was continuously added over 85 minutes by using a feed pump. After completion of the addition, the resultant was kept for 1 hour and then subjected to temperature rise to 90° C. and heated for 2 hours, to obtain Dispersion 1 containing Polymer Particle 1.

The use amounts of the respective reagents are summarized in Table 1. In addition, the number average molecular weight, the average particle diameter, and the Tg of Polymer Particle 1 were measured according to the aforementioned methods. The results are shown in Table 1.

Production Example 4 (Production of Dispersion 2 Containing Polymer Particle 2)

"KAO AKYPO (AKYPO is a registered trademark) RLM100NV" (main ingredient: polyoxyethylene lauryl ether sodium acetate, manufactured by Kao Corporation) was put in a reaction vessel equipped with a reflux tube, 255 parts by mass of ion-exchanged water was then added, and the contents were subjected to a deoxidation treatment at room temperature for 30 minutes by bubbling with a nitrogen gas, followed by raising the temperature to 70° C. Thereafter, 3.01 parts by mass of a potassium persulfate aqueous solution obtained by previously dissolving 0.1 parts by mass of potassium persulfate (polymerization initiator) in 30 parts by mass of ion-exchanged water in another vessel and performing a deoxidation treatment by the same method as mentioned above was added.

Subsequently, a solution (dealt with the deoxidation treatment) having n-butyl acrylate and t-dodecyl mercaptan (chain transfer agent) mixed therein was continuously added over 85 minutes by using a feed pump. After completion of the addition, the resultant was kept for 1 hour and then subjected to temperature rise to 90° C. and heated for 2 hours, to obtain Dispersion 2 containing Polymer Particle 2.

The use amounts of the respective reagents are summarized in Table 1. In addition, the number average molecular weight, the average particle diameter, and the Tg of Polymer Particle 2 were measured according to the aforementioned methods. The results are shown in Table 1.

Production Example 5 (Production of Dispersion 3 Containing Polymer Particle 3)

Dispersion 3 containing Polymer Particle 3 was obtained by performing the same operation as in Production Example 4, except for changing the chain transfer agent to n-dodecyl mercaptan, changing the kind of the dispersant, and further changing the use amounts of the respective components as shown in Table 1.

The use amounts of the respective reagents and the number average molecular weight, the average particle diameter, and the Tg of the obtained Polymer Particle 3 are shown in Table 1.

Production Example 6 (Production of Dispersion 4 Containing Polymer Particle 4)

Dispersion 4 containing Polymer Particle 4 was obtained by performing the same operation as in Production Example 3, except for changing the monomer (b1) to a mixed liquid of n-butyl acrylate, allyl methacrylate, and trimethylolpropane methacrylate, changing the kind of the dispersant, and further changing the use amounts of the respective components as shown in Table 1.

The use amounts of the respective reagents and the number average molecular weight, the average particle diameter, and the Tg of the obtained Polymer Particle 4 are shown in Table 1.

Production Example 7 (Production of Dispersion 5 Containing Polymer Particle 5)

"KAO AKYPO (AKYPO is a registered trademark) RLM100NV" (main ingredient: polyoxyethylene lauryl ether sodium acetate, manufactured by Kao Corporation) was put in a reaction vessel equipped with a reflux tube, 296 parts by mass of ion-exchanged water was then added, and the contents were subjected to a deoxidation treatment at room temperature for 30 minutes by bubbling with a nitrogen gas, followed by raising the temperature to 70° C. Thereafter, 3.61 parts by mass of a potassium persulfate aqueous solution (dealt with the deoxidation treatment) prepared by previously dissolving 0.1 parts by mass of potassium persulfate (polymerization initiator) in 30 parts by mass of ion-exchanged water in another vessel was added.

A solution (dealt with the deoxidation treatment) having n-butyl acrylate, allyl methacrylate, and trimethylolpropane trimethacrylate mixed therein was continuously added thereto over 50 minutes by using a feed pump. After completion of the addition, the resultant was kept for 1 hour. Subsequently, tricyclodecanyl methacrylate (dealt with the deoxidation treatment) was continuously added over 30 minutes by using a feed pump, and after completion of the addition, the resultant was kept for 2 hours. Furthermore, the resultant was subjected to temperature rise to 90° C. and heated for 2 hours, to obtain Dispersion 5 containing Polymer Particle 5.

The use amounts of the respective reagents and the number average molecular weight, the average particle diameter, and the Tg of the obtained Polymer Particle 5 are shown in Table 1.

Production Examples 8 and 9 (Production of Dispersions 6 to 7 Containing Polymer Particles 6 to 7, Respectively)

Dispersions 6 to 7 containing Polymer Particles 6 to 7, respectively were obtained by performing the same operation as in Production Example 7, except for changing the use amounts of the respective components as shown in Table 1.

The use amounts of the respective reagents and the number average molecular weight, the average particle diameter, and the Tg of each of the obtained Polymer Particles 6 to 7 are shown in Table 1.

Production Example 10 (Production of Dispersion 8 Containing Polymer Particle 8)

Dispersion 8 containing Polymer Particle 8 was obtained by performing the same operation as in Production Example 6, except for changing the monomer (b1) to tricyclodecanyl methacrylate and changing its use amount as shown in Table 1.

The use amounts of the respective reagents and the number average molecular weight, the average particle diameter, and the Tg of the obtained Polymer Particle 8 are shown in Table 1.

TABLE 1

|  |  | Production Example | | | | | | | |
|---|---|---|---|---|---|---|---|---|---|
|  |  | 3 | 4 | 5 | 6 | 7 | 8 | 9 | 10 |
| Polymer particle No. |  | 1 | 2 | 3 | 4 | 5 | 6 | 7 | 8 |
| Dispersion No. |  | 1 | 2 | 3 | 4 | 5 | 6 | 7 | 8 |
| Dispersant | Dispersant I | 1.87 |  |  |  |  |  |  |  |
|  | RLM100NV |  | 3.36 |  | 2.50 | 2.50 | 2.50 | 2.50 | 2.50 |
|  | LATEMUL E-108MB |  |  | 1.29 |  |  |  |  |  |
| Chain transfer agent | t-Dodecyl mercaptan |  | 1.2 |  |  |  |  |  |  |
|  | n-Dodecyl mercaptan |  |  | 0.18 |  |  |  |  |  |
| Monomer (b1) | n-Butyl acrylate | 75 | 150 | 75 | 57 | 85.5 | 57 | 27.4 |  |
|  | Allyl methacrylate |  |  |  | 0.6 | 0.9 | 0.6 | 0.3 |  |
|  | Tricyclodecanyl methacrylate |  |  |  |  | 28.5 | 57 | 85.5 | 57 |
|  | Trimethylolpropane trimethacrylate |  |  |  | 0.6 | 0.9 | 0.6 | 0.3 |  |
| Polymerization initiator | Potassium persulfate | 0.005 | 0.01 | 0.005 | 0.01 | 0.012 | 0.012 | 0.012 | 0.01 |
| Dispersion medium | Ion-exchanged water [1] | 150 | 300 | 150 | 300 | 300 | 300 | 300 | 300 |
| Structure of polymer particle |  | Single layer | Single layer | Single layer | Single layer | Core-shell | Core-shell | Core-shell | Single layer |
| Solid component amount of dispersion [3] [% by mass] |  | 32.38 | 30.70 | 32.51 | 27.44 | 26.97 | 26.74 | 26.58 | 25.89 |
| Measurement results | Number average molecular weight | — [2] | 30,000 | 39,000 | — [2] | — [2] | — [2] | — [2] | — [2] |
|  | Average particle diameter [nm] | 90.5 | 87.3 | 90.5 | 86.2 | 90.5 | 75.2 | 81.9 | 94.9 |
|  | Tg [° C.] | −55 | −55 | −55 | −55 | −55 | −55 | −55 | 135 |

The unit of the blending amount is parts by mass, and in the case of a solution or a dispersion, it is an amount expressed in terms of a solid component.

[1] Total amount of ion-exchanged water in the dispersion

[2] In the pre-treatment of GPC measurement, the filtration with a membrane filter could not be performed, and therefore, it was impossible to perform the measurement.

[3] The solid component amount of the dispersion was determined in terms of a weight change on heating at 140° C. with a heat drying type moisture meter (manufactured by A&D Company, Limited, MX-50).

Here, the respective components described in Table 1 are as follows.

(Dispersant)

Dispersant I: Dispersion I prepared in Production Example 3, solid component amount=32.2% by mass RLM100NV: "KAO AKYPO (AKYPO is a registered trademark) RLM100NV", manufactured by Kao Corporation, polyoxyethylene lauryl ether sodium acetate, solid component amount=24% by mass LATEMUL (registered trademark) E-108 MB: manufactured by Kao Corporation, polyoxyethylene polyoxypropylene lauryl ether sodium sulfate, solid component amount=22% by mass (Chain Transfer Agent)

t-Dodecyl mercaptan: manufactured by Tokyo Chemical Industry Co., Ltd.

n-Dodecyl mercaptan: manufactured by Tokyo Chemical Industry Co., Ltd.

(Monomer)

n-Butyl acrylate: manufactured by Nippon Shokubai Co., Ltd.

Allyl methacrylate: manufactured by Tokyo Chemical Industry Co., Ltd., a crosslinking agent Tricyclodecanyl methacrylate: manufactured by Tokyo Chemical Industry Co., Ltd.

Trimethylolpropane trimethacrylate: manufactured by Tokyo Chemical Industry Co., Ltd., a crosslinking agent (Polymerization Initiator)

Potassium persulfate: manufactured by Wako Pure Chemical Industries, Ltd., a radical polymerization initiator (Dispersion Medium)

Ion-exchanged water: ion-exchanged water having an electrical conductivity of $0.08 \times 10^{-4}$ S/m or less

Example 1 (Preparation of Emulsion and Production of Cast Film)

An emulsion (solid component amount: 4%) containing the Ethylene-Modified PVA-1 and the Dispersion 1 of Poly- mer Particle 1 was prepared in blending amounts (expressed in terms of a solid component) shown in the following Table 2.

The emulsion was cast on a polyester film to form a coating. This coating was air-dried for 2 days to obtain a cast film having a thickness of 45

In addition, the obtained cast film was measured for the physical properties according to the aforementioned methods. The results are shown in Table 2.

Examples 2 to 9

Figure 2:
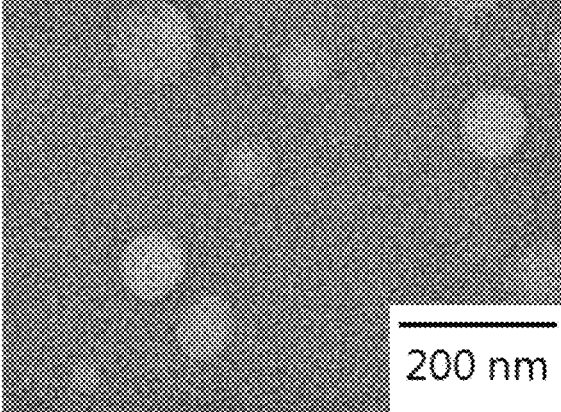
FIG. 2 is a photograph by a transmission electron microscope (TEM) (direct magnification: 50,000 times) of a cast film prepared in Example 2.

Cast films were prepared by performing the same operation as in Example 1, except for changing the respective components and the blending amounts thereof as shown in Table 2. In Example 2, the obtained cast film was observed with a transmission electron microscope (TEM), and photographs by the transmission electron microscope (TEM) are shown in FIGS. 1 and 2. The state in which the polymer particle was dispersed favorably could be observed.

In addition, the obtained cast films were measured for the physical properties according to the aforementioned methods. The results are shown in Table 2.

Comparative Examples 1 to 3

Cast films were prepared by performing the same operation as in Example 1, except for changing the respective components and the blending amounts thereof as shown in Table 2.

In addition, the obtained cast films were measured for the physical properties according to the aforementioned methods. The results are shown in Table 2.

Reference Example 1

A cast film was prepared by performing the same operation as in Example 1, except for changing the respective components and the blending amounts thereof as shown in Table 2.

In addition, the obtained cast film was measured for the physical properties according to the aforementioned methods. The results are shown in Table 2.

TABLE 2

| | | Example | | | | | | | | | Comparative Example | | | Reference Example |
| | | 1 | 2 | 3 | 4 | 5 | 6 | 7 | 8 | 9 | 1 | 2 | 3 | 1 |
|---|---|---|---|---|---|---|---|---|---|---|---|---|---|---|
| Emulsion | Ethylene-Modified PVA-1 | 100 | 100 | 100 | 100 | 100 | 100 | 100 | 100 | 100 | 100 | 100 | 100 | |
| | PVA-2 | | | | | | | | | | | | | 100 |
| | Dispersion 1 | 5 | | | | | | | | | | | | 30 |
| | Dispersion 2 | | 5 | 30 | | | | | | | | | 100 | |
| | Dispersion 3 | | | | 5 | | | | | | | | | |
| | Dispersion 4 | | | | | 5 | | | | | | | | |
| | Dispersion 5 | | | | | | 5 | | | | | | | |
| | Dispersion 6 | | | | | | | 5 | | | | | | |
| | Dispersion 7 | | | | | | | | 5 | | | | | |
| | Dispersion 8 | | | | | | | | | 5 | | | | |
| | Glycerin | | | | | | | | | | | | 5 | |
| Measurement results | Emulsion Dispersibility | A | A | A | A | A | A | A | A | A | — | A | B | C |
| | Film Initial elastic modulus [MPa] | 32 | 34 | 25 | 25 | 25 | 31 | 29 | 32 | 33 | 40 | 15 | 5.3 | — |
| | Yield stress [MPa] | 70 | 77 | 48 | 86 | 59 | 61 | 59 | 62 | 67 | 77 | — | 17 | — |
| | Resilience [MPa] | — | — | — | — | — | — | — | — | — | — | 34 | — | — |
| | Elongation at break [%] | 212 | 334 | 269 | 366 | 176 | 173 | 143 | 157 | 139 | 34 | 298 | 296 | — |

The blending amount is an amount expressed in terms of a solid component (unit: parts by mass).

Here, the respective components described in Table 2 are as follows.

Ethylene-Modified PVA-1: Ethylene-Modified PVA-1 prepared in Production Example 1

PVA-2: PVA-2 prepared in Production Example 2

Dispersions 1 to 8: Dispersions 1 to 8 each containing the polymer particles prepared in Production Examples 3 to 10, respectively Glycerin: manufactured by Wako Pure Chemical Industries, Ltd.

From Table 2, it is noted that in the cast films prepared in the Examples, both the rigidity and the elongation are made compatible with each other. As for the reason why such results were obtained, it may be conjectured that the particle (B) relieved the stress applied to the ethylene-modified PVA (A) while maintaining the mobility of a crystal phase or an amorphous phase of the ethylene-modified PVA (A) serving as a matrix.

On the other hand, in the cast film prepared in Comparative Example 1, the elongation at break becomes significantly small, so that it may be said that the elongation is insufficient. In the case film prepared in Comparative Example 2, while the elongation at break became larger owing to glycerin, the initial elastic modulus and the resilience are very small, so that it may be said that the rigidity is poor. In the cast film prepared in Comparative Example 3, though the elongation at break became large owing to the particle (B), in view of the fact that the content of the particle (B) is in excess, the initial elastic modulus and the yield stress are very small, so that it may be said that the rigidity is poor.

In the case film prepared in Reference Example 1, since the dispersibility of the polymer particle in the emulsion was bad (the aggregation of the particle was observed), it cannot be expected that both rigidity and elongation at sufficient levels can be made compatible with each other.

INDUSTRIAL APPLICABILITY

The composition of the present invention can be suitably used as the coating or film, and in addition thereto, it can also be suitably used for applications, such as an adhesive, a fiber processing agent, a binder, a coating agent, an ink, and a paint. In addition, since both the rigidity and the elongation are made compatible with each other at high levels in the film of the present invention, it is useful as various films, such as a wrapping film, a protective film, an oxygen gas barrier film, and a vapor barrier film.

The invention claimed is:

1. A composition, comprising:

water;

an ethylene-vinyl alcohol copolymer (A) having a content of an ethylene unit of 0.5 to 19 mol. % relative to all structural units; and a particle (B) comprising a polymer particle (B$^X$), wherein the particle (B) is present in the composition in a range of from 1 to less than 100 parts by mass, based on 100 parts by mass of the ethylene-vinyl alcohol copolymer (A), wherein the particle (B) has an average particle diameter in a range of from 10 to 500 nm, wherein the particle (B) does not include a polyvinyl alcohol-based polymer, wherein the composition is an aqueous emulsion, and wherein the composition comprises solid components in a range of from 1 to 30% by mass.

2. The composition of claim 1, wherein the particle (B) consists of the polymer particle (B$^X$).

3. The composition of claim 1, wherein the polymer particle (B$^X$) comprises a (meth)acrylic acid ester-based polymer particle, a conjugated diene-based polymer particle, a styrene-based polymer particle, a styrene/conjugated diene-based copolymer particle, a urethane-based polymer particle, a vinyl acetate-based polymer particle, an ester-based polymer particle, an amide-based polymer particle, an imide-based polymer particle, a carbonate-based polymer particle, an allylate-based polymer particle, a sulfone-based polymer particle, and/or a phenoxy-based polymer particle.

4. The composition of claim 1, wherein the polymer particle (B$^X$) comprises a (meth)acrylic acid ester-based single-layer type polymer particle and/or a (meth)acrylic acid ester-based core-shell type polymer particle.

5. The composition of claim 1, wherein the polymer particle (B$^X$) comprises a dispersant comprising an ionic group.

6. The composition of claim 5, wherein the ionic group comprises an anionic group.

7. The composition of claim 5, wherein the ionic group comprises a salt of an anionic group.

8. The composition of claim 1, which is an application suitable for an adhesive, a fiber processing agent, a binder, a coating agent, ink, or a paint.

9. The composition of claim 1, wherein the water is present in the composition in a mass ratio in a range of from 2 to 5.26-fold, relative to a mass of all monomers used in the polymer particle (B$^X$).

10. The composition of claim 1, wherein the particle (B) further comprises an inorganic particle (B$^Y$).

11. The composition of claim 1, comprising no elastomer polymers.

12. The composition of claim 1, comprising no polymers besides the ethylene-vinyl alcohol copolymer (A), the particle (B), and, optionally, polymers selected from the group consisting of an ionomer, polyester, polystyrene, polyamide, polyolefin, polyvinyl chloride, polycarbonate, acrylic, ethylene-acrylic acid copolymer, ethylene-acrylic acid ester copolymer, ethylene-methacrylic acid copolymer, ethylene-methacrylic acid ester copolymer, ethylene-vinyl acetate-based copolymer, polyvinylidene chloride, vinyl ester, chlorinated polyolefin, and a mixture thereof.

13. The composition of claim 1, comprising the water, the ethylene-vinyl alcohol copolymer (A), the particle (B), and, optionally, a further component in no more than 5% by mass.

14. A coating, comprising, in dried form:
the composition of claim 1.

15. A base material, comprising, in dried form:
the coating of claim 14.

16. A film, comprising, in dried form;
the composition of claim 1.

17. The film of claim 16, having a thickness in a range of from 40 to 60 μm.

18. A composition, comprising:

an ethylene-vinyl alcohol copolymer (A) comprising, in polymerized form, ethylene in a range of from 0.5 to 19 mol. %, relative to all polymerized monomer units; and a particle (B) comprising a polymer particle (B$^X$), the polymer particle (B$^X$) being a single-layer polymer particle, and wherein the particle (B) is present in the composition in a range of from 1 to less than 100 parts by mass, based on 100 parts by mass of the ethylene-vinyl alcohol copolymer (A), wherein the particle (B) has an average particle diameter in a range of from 10 to 500 nm, wherein the particle (B) does not include a polyvinyl alcohol-based polymer, wherein the composition is an aqueous emulsion, and wherein the composition comprises solid components in a range of from 1 to 30% by mass.

19. The composition of claim 18, further comprising:

water in a mass ratio range of from 2 to 5.26-fold, relative to a mass of all monomers used in the polymer particle $(B^X)$.

20. A composition, comprising:

water;

an ethylene-vinyl alcohol copolymer (A) having a content of an ethylene unit of 0.5 to 19 mol. % relative to all structural units; and a particle (B) comprising a polymer particle $(B^X)$, wherein the particle (B) is present in the composition in a range of from 1 to less than 100 parts by mass, based on 100 parts by mass of the ethylene-vinyl alcohol copolymer (A), wherein the particle (B) has an average particle diameter in a range of from 10 to 500 nm, wherein the particle (B) does not include a polyvinyl alcohol-based polymer, wherein the composition is an aqueous dispersion, and wherein the composition comprises solid components in a range of from 1 to 30% by mass.

* * * * *